United States Patent [19]

Lines

[11] Patent Number: 4,846,923
[45] Date of Patent: Jul. 11, 1989

[54] PRODUCTION LINE ASSEMBLY FOR MAKING WOODEN I-BEAMS

[75] Inventor: Jerry L. Lines, Wilmington, N.C.

[73] Assignee: MiTek Industries, Inc., St. Louis, Mo.

[21] Appl. No.: 27,212

[22] Filed: Mar. 17, 1987

Related U.S. Application Data

[63] Continuation-in-part of Ser. No. 843,228, Mar. 24, 1986, Pat. No. 4,720,318.

[51] Int. Cl.$^4$ .................... B27D 1/10; B32B 31/18
[52] U.S. Cl. ................... 156/353; 156/258; 156/259; 156/260; 156/264; 156/510; 156/516; 156/517; 156/556; 156/566; 144/3 M; 144/136 R; 52/729
[58] Field of Search ............... 156/257, 258, 259, 260, 156/264, 353, 513, 516, 517, 556, 566; 144/347, 355, 361, 366, 368, 371; 83/861, 862, 864; 52/729, 731

[56] References Cited

U.S. PATENT DOCUMENTS

| | | | |
|---|---|---|---|
| 3,477,485 | 11/1969 | Talbott | 144/355 |
| 3,894,908 | 7/1975 | Troutner et al. | 52/729 |
| 4,074,498 | 2/1978 | Keller et al. | 52/729 |
| 4,123,315 | 10/1978 | Keller et al. | 144/371 |
| 4,191,000 | 3/1980 | Henderson | 52/729 |
| 4,195,462 | 4/1980 | Keller et al. | 52/729 |
| 4,356,045 | 10/1982 | Elford et al. | 144/355 |
| 4,413,459 | 11/1983 | Lambuth | 52/729 |
| 4,456,497 | 6/1984 | Eberle | 52/729 |
| 4,458,465 | 7/1984 | Coe | 52/729 |
| 4,471,822 | 9/1984 | Griganavicius | 144/368 |

Primary Examiner—Caleb Weston
Attorney, Agent, or Firm—Senniger, Powers, Leavitt & Roedel

[57] ABSTRACT

A complete production line assembly of a wooden I-beam manufacturing apparatus is disclosed, wherein generally identical chord members are simultaneously formed by cutting of a wooden stock material into the chord members and simultaneously providing grooves in one surface of each chord into which web members are received to form the I-beam. The individual web members are conveyed as stacks into a web infeed hopper where the individual web members are sequentially discharged from the hopper into a chords and webs assembly line. The web transfer mechanism for conveying the webs to the hopper is fully automated. The individual web members are conveyed along the assembly line between the grooved chords and the chords are converged so that the grooves interfit with the web edges to form the I-beam. The chords and webs assembly line is adjustable by virture of mounting guide rollers on at least one adjustable side frame to enable the line to manufacture wooden I-beams of varying depth. An overhead web drive system is utilized to drive the webs within the assembly line and is vertically adjustable to enable easy access to the assembly line for inspection or repair and to accommodate flange members of different thickness. After the wooden I-beams are cut to desired length, they are conveyed to a stacking area where they are uniquely stacked in a nested and staggered relationship prior to being conveyed for shipping.

17 Claims, 9 Drawing Sheets

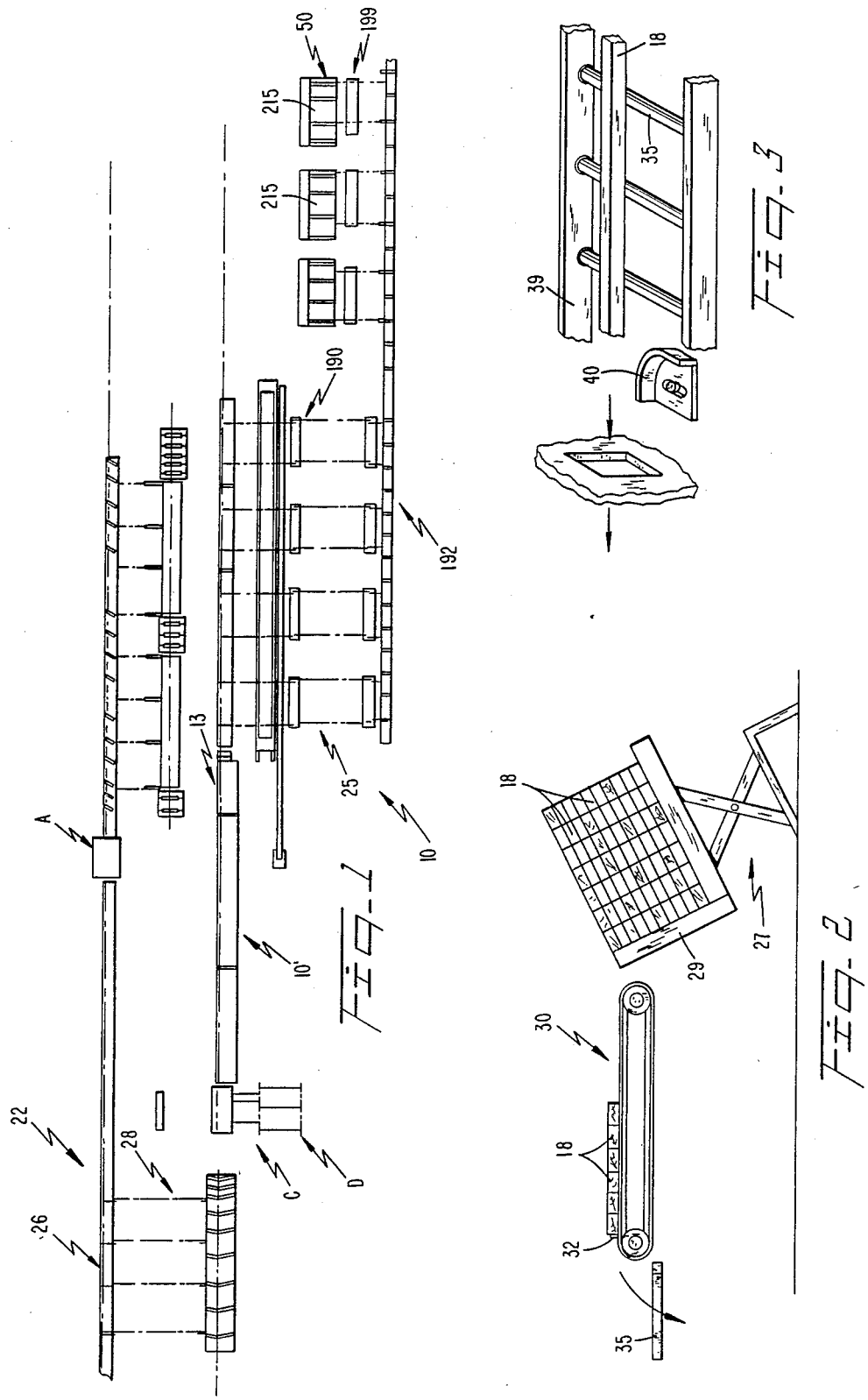

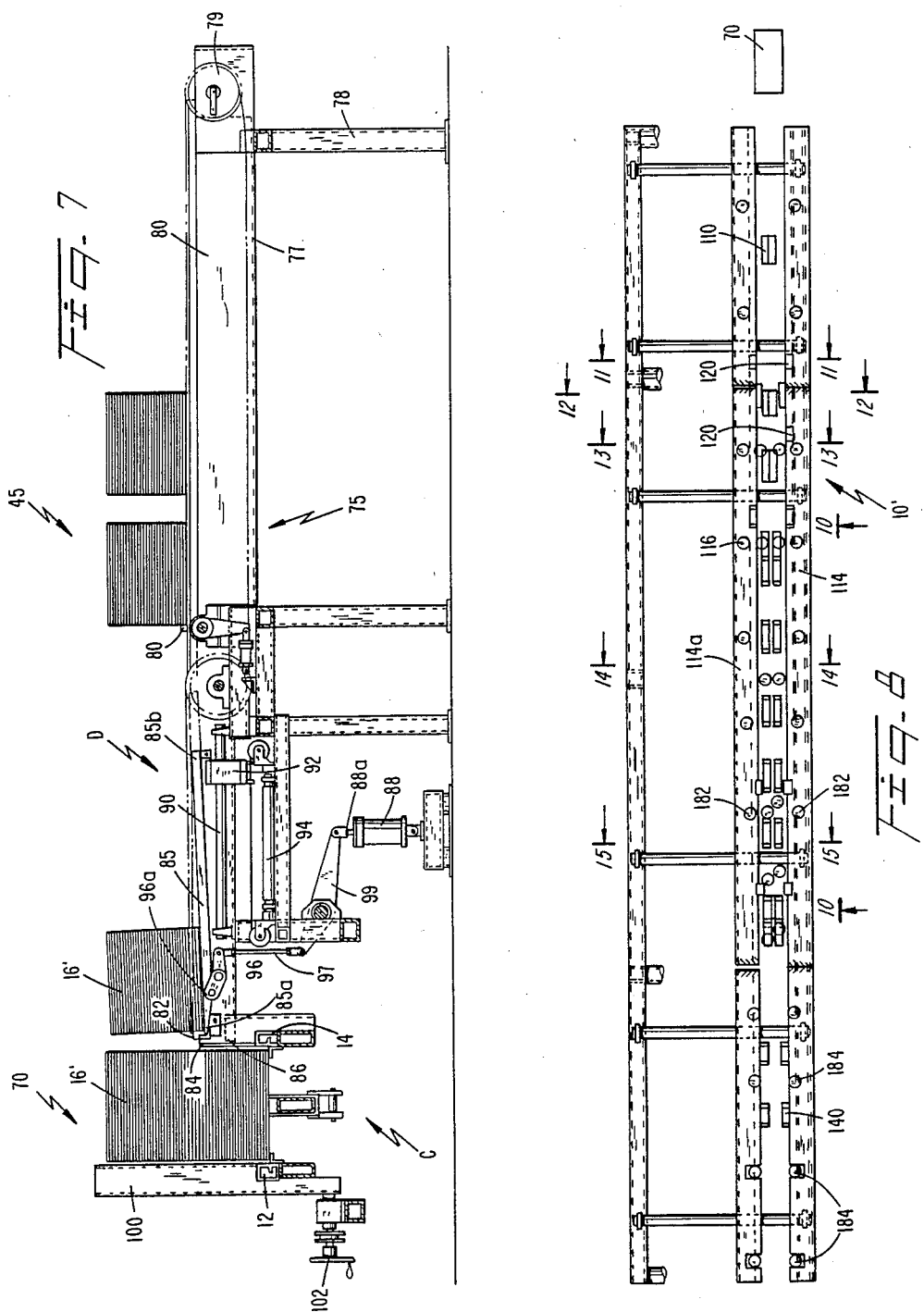

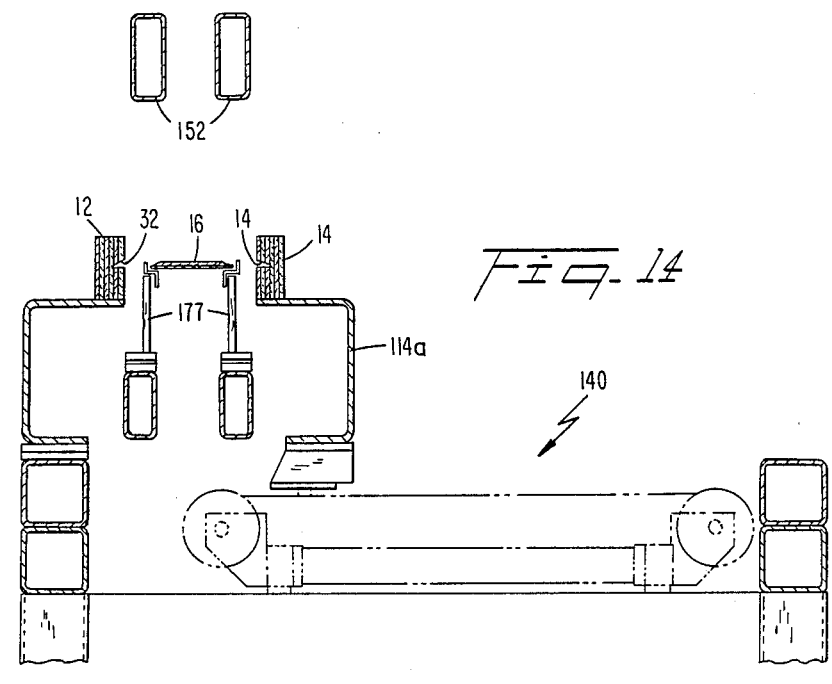
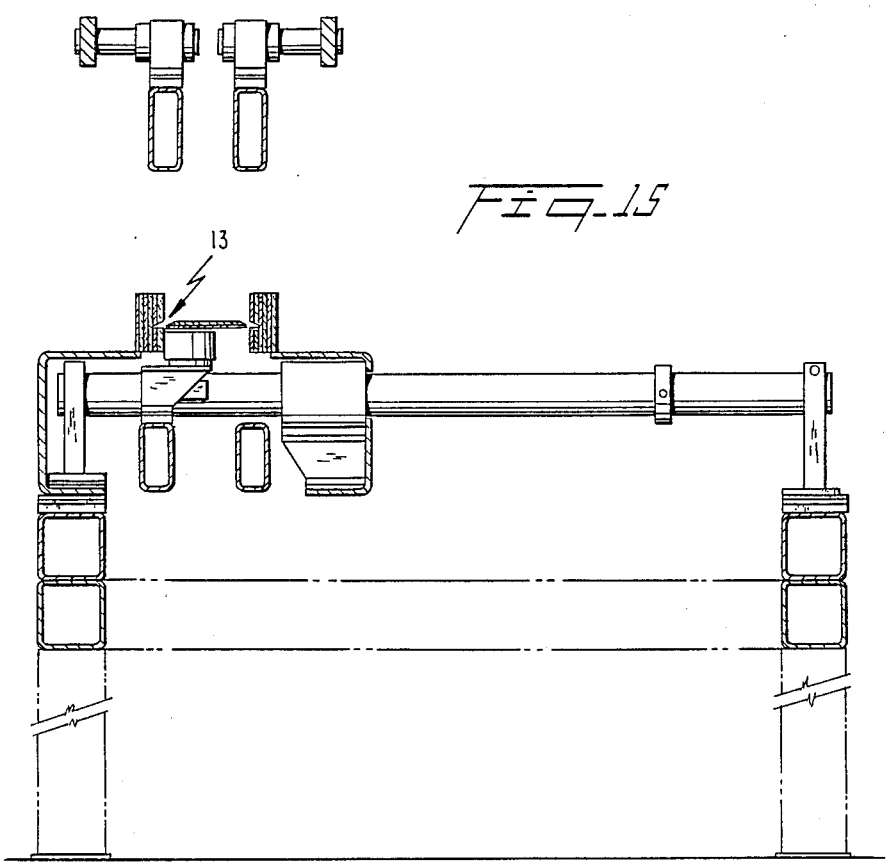

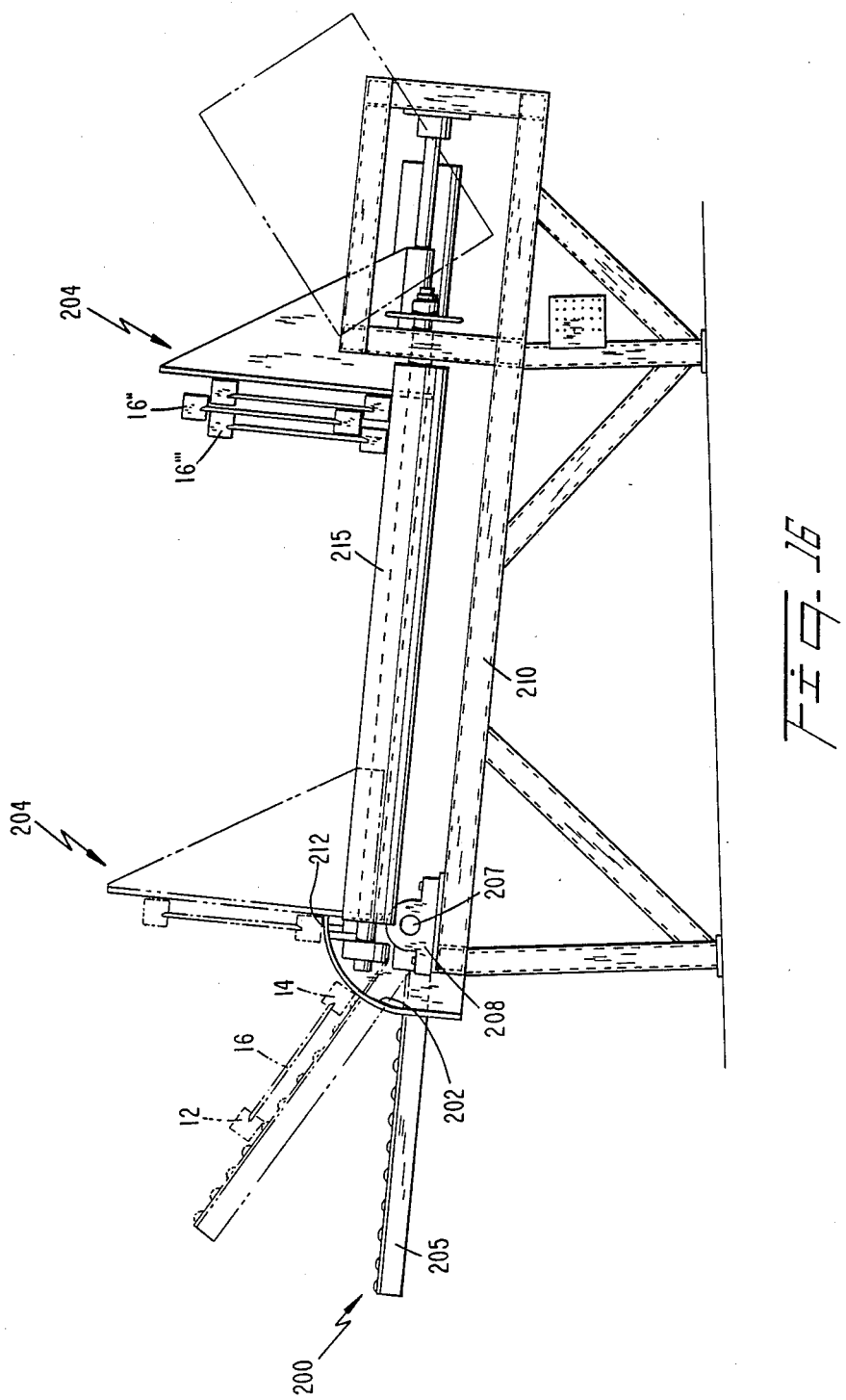

PRODUCTION LINE ASSEMBLY FOR MAKING WOODEN I-BEAMS

RELATED APPLICATIONS

The present application is a continuation-in-part of copending U.S. patent application Ser. No. 843,228, filed Mar. 24, 1986, now U.S. Pat. No. 4,720,318, which in turn is a continuation-in-part of U.S. patent application Ser. No. 764,180, filed Aug. 9, 1985.

BACKGROUND OF THE INVENTION

This invention relates to an improved production line assembly and component apparatus therein for making a wooden I-beam fabricated from a pair of wood chord members and a wood web member interconnecting such chord members by means of glued or unglued joints.

In the related copending U.S. application identified supra, there are disclosed various improvements to method and production line assembly apparatus for making wooden I-beams necessitated by the rising costs of sawn lumber in general and the scarcity of high quality wood capable of producing beams of large size. The use of fabricated beams permits more efficient design requiring less wood to provide a beam of given strength. This not only saves wood but also reduces the cost of transportation and facilitates the erection of wooden structures.

This invention relates to methods and apparatus for making wooden I-beam structures wherein both the chord or flange members and the webs may either be solid wood members or composite or laminated wood members as desired. Beams of this general type have been disclosed extensively in the prior art as illustrated, by way of example, in U.S. Pat. Nos. 3,490,188, 4,074,498, 4,191,000, 4,195,462, 4,249,355, 4,336,678, 4,413,459, 4,456,497 and 4,458,465, the foregoing listing being intended as exemplary only and not as all inclusive.

Prior known procedures and arrangements for forming prefabricated wooden I-beams by gluing various members together have generally entailed the use of various sub-assemblies in which a series of webs are driven along a web conveyor line in either spaced or end to end abutting relation, with a pair of grooved chords or flanges driven along opposite sides of the web conveyor. The flanges are driven with their grooves facing the webs and are generally converged towards the conveyed webs so that the longitudinal web edges, often pre-glued, are forced to respectively enter the grooves to form an interconnecting glued joint therewith. Heat or radio frequency energy may be used to set the glue more quickly and the formed wooden I-beams emerging from the assembly line may then be cut, if necessary, to form a wooden I-beam of desired length.

Other sub-assemblies and mechanical procedures are employed to cut the chords or flange members to desired lengths and widths usually delivered to the I-beam production facility where a groove cutter is employed to cut a longitudinal groove along the length of the chord in one side thereof. Typically, however, wooden stock material of either random or constant lengths are delivered to the production facility where the material is split or cut substantially along the longitudinal axis to form a pair of chord members. These chord members are then conveyed to a separate sub-assembly containing a groove cutter for cutting the grooves as aforesaid.

Other sub-assemblies are employed to cut the web members to desired length and width and thereafter to provide parallel beveled or shaped edges along longitudinal sides of the web members, such edges being generally complementary with the cross-sectional groove shapes.

In one prior art arrangement disclosed in Elford et al, U.S. Pat. No. 4,356,045, acquired by the assignee of the present application, flanges or chord members pre-cut to desired width are joined together from random lengths to obtain corresponding top and bottom chords of desired length. Upon being cut, numerous sub-assemblies are then employed to groove the separate flange or chord members. These sub-assemblies include a chord transfer mechanism and production floor space therefor, a groove cutter staging area, a groove cutter conveyor, a groove cutter mechanism and an automatic repositioning mechanism for cutting a groove surface in the chord member one at a time.

The foregoing acts of cutting identical chords or flanges from wooden stock material of either random or standard length engenders the use of considerable handling of wooden material and corresponding machinery first to actually cut the material and then to actually deliver same to other machinery for groove cutting.

Separate equipment and operations are provided for longitudinal beveled or other shaped edges in the web members employed in prior known procedures and arrangements. In the above-identified Elford et al patent, for example, motor driven bevel forming heads are employed to create tapers on opposite longitudinal edges of the webs by introducing individual plywood web pieces, pre-cut to approximate width onto a web support drive roll which conveys the individual pieces past the straight cutting heads. The cutting heads are employed directly within the production line upstream from where the webs are successively conveyed into abutment with one another to form a continuous web material. In the event the bevel forming heads and associated drive and conveyor machinery require repair, a particular production run must be stopped until such repair is effected. In other words, there is no provision for stock-piling pre-cut, individual beveled web members for later use in a particular production run so that such reproduction run is not dependent upon the act of beveling the individual web pieces during the actual run.

In the commerical practice of the Elford et al patent, a glue layer is applied to a leading transverse end of each web member as it is initially fed into the production line upstream from the bevel forming heads. As the pre-glued web members enter into contact with the bevel forming heads, glue from the leading end tends to drip down and enter between the bottom of the web member and an underlying bed plate or support on which the webs move past the bevel forming heads. This glue tends to form a film along which the bottom of the web members ride causing misalignment with the bevel forming heads which later result in an inferior joint with the interconnecting chords and the grooves therein.

Glue coated onto the leading transverse edge of each web prior to beveling is also to some extent absorbed into the porous wooden material forming the web. This occasionally results in inferior bonds between the webs when later moved into end to end relationship to form a continuous web, compromising the structural integrity of the formed wooden I-beam.

After the webs are joined to the length of each of a pair of chords forming the wooden I-beam, the beam is conveyed towards a cutting saw which is connected to a spring mounted feeler bar upstream from the saw that rides along one of the chords to sense the trailing end thereof. This trailing end is identified by driving preceding and succeeding respective top and bottom chords into joining contact with the web members to form a gap between the adjacent chords which is typically four to eight inches in length. The spring mounted feeler bar thus senses the trailing end by entering the gap. The web cutting saw is then pulled towards the gap to cut the web at the gap while moving at the same production line speed thereof. This gap must be trimmed from each adjoining free end of adjacent cut wooden I-beams resulting in wasted material and the requirement of trimming at least one end of each cut wooden I-beam following the cutting cycle.

According to other prior designs disclosed, for example, in Talbott, U.S. Pat. Nos. 3,477,485, Troutner, 3,616,091, Troutner et al, 3,984,908, individual flange groove cutters and web beveling heads are mounted directly within the associated production line. This means that additional machinery and handling was previously required to cut wooden stock material into substantially identical flange or chord members which are then fed into the production line for joining two webs.

Other arrangements and types of production line and related method and apparatus for forming wooden I-beams have been proposed in the prior art, and it is to be understood that the foregoing discussion is intended as illustrative and not as all inclusive. While certain of these prior known arrangements and systems may provide one or more advantages, they also present problems and disadvantages.

In the copending U.S. patent application Ser. No. 843,228, identified supra, the disclosure of which is incorporated by reference herein in its entirety, numerous solutions to the above-mentioned prior known procedures and arrangements are disclosed and claimed. The present application is directed towards further improvements to the production line assembly and related apparatus to further improve production efficiency of high throughput and which achieves a high quality wooden I-beam product.

SUMMARY OF THE INVENTION

It is a primary object of the present invention to provide a production line assembly for fabricating a wooden I-beam which overcomes or at least minimizes the disadvantages encountered with prior methods and apparatus for making same.

One of the principal objects of the present invention is to provide a production line assembly in which the web drive and the flange drive and guide rollers therefor may be easily adjusted to accommodate wooden web members of varying width and thereby wooden I-beams of varying corresponding depth.

Another object of the present invention is to provide a production line assembly wherein the web conveying system in the assembly line is adjustable to accommodate flanges having different widths necessitating a change in elevational position of the web members conveyed through the assembly line to enable the side edges of the web members to be received within the longitudinal grooves formed in the flange members.

Another object of the present invention is to improve upon the manner in which stacks of webs are prepared and automatically loaded into a web stack infeed hopper positioned upstream from the assembly line.

Another object of the invention is to improve upon the manner in which wooden stock material is more or less simultaneously cut into a pair of ground chord members either on or off the production line.

Yet a further object of the invention is to provide improvements as to the manner in which cut wooden I-beams are nested and stacked together following their formation on the assembly line.

Another object of the invention is to provide a wooden I-beam which is formed by driving preceding and suceeding flange or chord members into abutting or end to end contact with each other prior to being connected to the web members to minimize waste material and lower production costs.

Yet another object is to provide a wooden I-beam cut to standard or custom lengths using the techniques and equipment disclosed in the prior copending U.S. patent application identified supra, or other techniques and equipment well known in the art.

According to the present invention, there is disclosed a production line assembly for manufacturing a unitary wooden I-beam from a pair of longitudinally grooved elongated wooden chord members and planar wooden web members provided with opposite longitudinally shaped edges. The production line assembly comprises a conveyor for moving the web members along the assembly line in generally end to end relationship as a substantially continuous web and there is also conveyor means for moving a pair of chords respectively along opposite sides of the continuous web with the longitudinal grooves facing the web. The chord conveying means includes chord drive members. Guide rollers are provided for directing the pair of chords towards the continuous web so that opposite edges of the continuous web are respectively inserted into the longitudinal grooves of the pair of chords to form an interconnecting joint therebetween and thereby the I-beam. The chord directing means includes guide rollers mounted on side frames extending along opposite sides of the production line. One of the side frames extending adjacent one of the chords is adjustable in a direction generally perpendicular to the chords to vary the spacing of the guide rollers mounted on the adjustable side frame relative to the guide rollers mounted on the other side frame to thereby enable the assembly to manufacture wooden I-beams of varying depths.

Preferably, an overhead web drive within the assembly line is mounted to engage an upward exposed surface of the continuous web for directing same along the assembly line at a predetermined continuous speed. The overhead web drive is elevationally adjustably mounted to the side frames to accommodate flanges of varying thickness by being disposed to contact the upper surface of the continuous web at selective different elevational positions of the web corresponding to the elevational position of the flange grooves. There is also provided web supporting means disposed in contact with a lower surface of the continuous web and means for elevationally adjusting the position of the web supporting means for accommodating the flanges of varying thickness.

It is a preferred feature of the present invention to mount the adjustable side frame upon shafts connected to a stationary support frame with the shafts extending generally perpendicular to the adjustable side frame. Stop means is disposed on the stationary support frame outwardly adjacent the movable side frame and against which the movable side frame abuts once the stop means is fixed at a selective location along the support frame to fix the adjustable spaced location of the movable frame on the shaft means.

A cylinder and cable arrangement may be connected to extend between the movable side frame and the associated stationary support frame between which frames the shaft means extend. The cylinder and cable arrangement is actuated to move the movable side frame along the shaft means into abutting contact with the stop means.

The overhead web drive conveyor preferably includes longitudinally extending support bars mounted to the side frames with support posts and a series of driven and drive rollers extending transversely between the support bar means above the continuous web. A belt is trained around the rollers for engaging the continuous web. The support bar means supporting the overhead web drive is connected to the support posts by means of a cylinder and crank arrangement operable, upon actuation of the cylinder, to adjust the vertical spacing of the overhead web drive belt relative to the continuous web. The cylinder and crank arrangement may also be utilized to rapidly displace the overhead web drive into an upper maximum height location to enable quick and easy access to the chords and webs assembly for inspection or repair purposes.

In accordance with other features of the invention, there is further disclosed a web feed system for successively feeding a stack of pre-cut members to an upstream position of the assembly line for sequential feeding of the web members in the stack into the line as a continuous web. The web transfer system includes web infeed chain conveyor means for receiving individual stacks of webs positioned side by side on an upper run of the infeed chain conveyor means and stop means for maintaining the individual web stacks in predetermined positions on the infeed conveyor means.

Control means is provided for releasing the stop means to selectively feed an individual one of said stacks of webs to a downstream end of the infeed chain conveyor means located adjacent a web infeed hopper. There is further disclosed a web transfer mechanism for delivering the individual web stack positioned at the downstream end of the infeed conveyor into the hopper. The transfer mechanism includes a pair of forks movable between upper and lower positions. In the lower position, the pair of forks are disposed elevationally below the upper run of the infeed conveyor. Raising of the transfer forks into their upper position causes the forks to contact and support the stack of webs. The forks then move towards the web infeed hopper carrying the stack and causing same to be moved into the hopper. While in their extended position, the forks are lowered and then retracted out of the hopper causing the web stack to be scraped from the forks and dropped into the infeed hopper for subsequent feeding into the chords and webs assembly line.

The forks are preferably mounted for sliding movement along shaft means extending below the downstream end of the infeed chain conveyor means. There is further provided a cylinder arrangement mounted to slide collar means slidably connecting the forks to the shaft, whereby actuation of the cylinder arrangement in response to a signal from the control means causes the forks to move along the shaft means. There is also provided a further cylinder and crank arrangement mounted beneath the infeed chain conveyor for raising and lowering the forks in response to another signal from the control means.

The control means which may be in the form of limit switches and other types of switches and circuitry known in the art is strategically positioned in the following manner. First, when the webs in the infeed hopper drop below a certain elevational position, this may be sensed causing actuation of the cylinder and crank arrangement to lift the forks into their upper position where they are supporting a web stack located at the downstream end of the infeed chain conveyor means. The forks then slide along the shaft means via actuation of the cylinder arrangement to an extended position within the infeed hopper above the feeding stack of webs. The location of the forks in their extended position actuates another switch which causes the forks to descend to their lower position and retract along the shaft means out of the infeed hopper, causing the web stack to be scraped off the forks into the hopper. This action starts the infeed chain conveyor means which then stages a single web stack at the downstream end of the conveyor above the forks ready to repeat the transfer of the web stack into the infeed hopper. The operation of the foregoing web feed system is preferably fully automatic except for fork truck delivery of pallets of webs onto the upstream end of the infeed chain conveyor means.

The web infeed hopper is defined by front and rear walls extending transversely with respect to the direction of feed of the webs into the assembly line, and a fixed wall extending between the front and rear walls. A second side wall is formed adjacent the downstream end of the infeed chain conveyor means. The second side wall is open to the chain conveyor means to enable the forks supporting a stack of webs in their raised position to pass through the second side wall means into the infeed hopper.

Following formation of the wooden I-beams on the assembly line, and cutting of said I-beams into predetermined desired length, the cut wooden I-beams are then conveyed to a stacking area. The stacking area includes a series of inclined stacker roll cases receiving the cut wooden I-beams one by one from a chain conveyor means. Each wooden I-beam is transferred along the stacker roll cases to a lower inclined bottom end thereof terminating in a curved fence presenting a convex curved face projecting upwardly from the bottom end of the inclined roll cases. In this position, the wooden I-beam and both flanges thereof rest upon the roll cases with the webs extending generally parallel to the roll cases. A bottom edge surface of one of the I-beam flanges rests against the curved surface of the fence.

Transfer beams means is normally disposed below the stacker roll cases for transferring the individual cut wooden I-beams conveyed to the bottom of the inclined roll cases for movement along the curved fence into a generally upright position against a stacking fence located adjacent an upper end of the curved fence. Such transfer beam means preferably includes a plurality of transfer beams respectively disposed between adjacent ones of the inclined stacker roll cases. The transfer beams are pivotally secured at one end thereof to a common shaft rotatable to pivot the beams from their lower position below the roll cases so that the individual I-beam having both flanges resting on the transfer beams is conveyed with one surface of a wooden I-beam flange in sliding contact with the curved fence until the transfer beams pivot the wooden I-beam into an upright position against the stacking fence.

The stacking fence is movable along support means having a support surface disposed elevationally below the upper curved end of the curved fence so as to receive the flange member in contact with the curved fence for supporting the cut wooden I-beam in an upright position. The stacking fence is movable away from the curved fence so that the flange member of the cut wooden I-beam in contact with the curved fence may drop down onto the support means. Thus, the next in-line cut wooden I-beam conveyed along the curved fence by the transfer beams will stack against the previously conveyed wooden I-beam in a staggered and nested relationship by virtue of the retractable nature of the stacking fence and the incremental movement of the stacking fence along the support means as each wooden I-beam is conveyed into the staggered and nested relationship by the transfer beam means.

When a predetermined number of cut wooden I-beams are transferred by the transfer beam means into staggered and nested relationship with each other against the stacking fence, a conveyor means disposed between the curved fence and stacking fence is actuated so that the predetermined number of wooden I-beam may be conveyed towards a shipping area.

In accordance with other features of the present invention, there is also disclosed improvements to methods and apparatus for cutting a flange stock material into a pair of substantially identical flange or chord members each having a longitudinal groove in one surface thereof. The method and apparatus features a moulder cutter head disposed to protrude upwardly from a bed plate along which the flange stock material moves to contact the underside of the flange stock material for splitting same into individual chord members while grooving the bottom surface thereof. The bottom moulder cutter head may be assisted by an overhead moulder cutter head mounted upstream therefrom providing initial or partial splitting of the flange stock material while shaping by rounding edge surfaces of the flange stock material.

The flange stock material is initially stacked on a scissors lift having an upper end positioned to discharge a row of flange stock material members onto a cross-transfer conveyor via incremental raising movement of the scissors lift. The row of flange stock materials abut a stop member for sequential downstream end positioning of the flange stock material prior to being fed onto an infeed driven roll conveyor feeding the individual flange stock materials towards the moulder cutter heads.

Other objects and advantages of the present invention will become apparent as the following description proceeds.

BRIEF DESCRIPTION OF THE DRAWING

Additional objects and advantages of the present invention will be apparent from the following detailed description of the accompanying drawings wherein:

FIG. 1 is a diagrammatic floor plan view showing an illustrative assembly line arrangement for performing the principal steps of joining the flanges or chords to the web of a wooden I-beam in accordance with the present invention and floor plan locations wherein the wooden flange stock material is simultaneously cut and grooved to form grooved chord members;

FIG. 2 is a partial schematic and elevational view of a scissors lift and transfer mechanism for conveying the flange stock material to an infeed roll case;

FIG. 3 is a partial perspective view of the infeed roll case receiving the flange stock material from the transfer and conveyor mechanism of FIG. 2 and directing same into a cutting and grooving station;

FIG. 7 is a side plan view of a web transfer mechanism for delivering stacks of webs into a web infeed hopper;

FIG. 8 is a top plan schematic view of a chords and webs assembly line employed in the present invention;

FIG. 14 is a sectional view taken along the line 14—14 of FIG. 8;

FIG. 15 is a sectional view taken along the line 15—15 of FIG. 8;

FIG. 16 is a side elevational view of a mechanism for receiving cut wooden I-beam and stacking same together in a stacking area.

DESCRIPTION OF PREFERRED EMBODIMENTS

Figure 4:
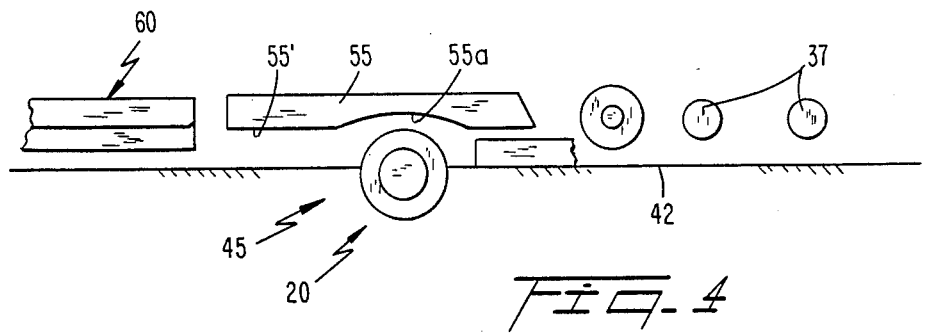
FIG. 4 is a partial schematic and side plan view of an apparatus for simultaneously splitting and grooving the flange wooden stock material into a pair of separate chord members.

Referring in detail to the figures of the drawing, there is shown diagrammatically in FIG. 1 a production area 10 including an assembly line 10' for making wooden I-beams having wood flanges or chords and wood web members. Specifically, the assembly line 10' performs various operations to secure flange or chord members 12 and 14 to a series of wood web members 16 to form web to chord joints generally indicated by 13 (FIG. 15). The web or wood member 16 is preferably formed of polywood or oriented strand board, called "OSB" (a form of flake board wherein strands of wood are oriented, overlapped and secured together by suitable glues to achieve strength properties superior to plywood) or the like. The web members may be of varying thicknesses such as $\frac{3}{8}$, 7/16, $\frac{1}{2}$, $\frac{5}{8}$ inch and the like. The web member in the assembled wood I-beam constitutes a plurality of abutted sheets of such boards. These sheets generally constitute rectangles having a long dimension along a longitudinal axis which is substantially parallel to the longitudinal axes of the elongated chord or flange members 12 and 14. The web sheets from butt joints with one another, and the web members preferably are secured together at such butt joints with adhesive or glue as described below.

Figure 6:
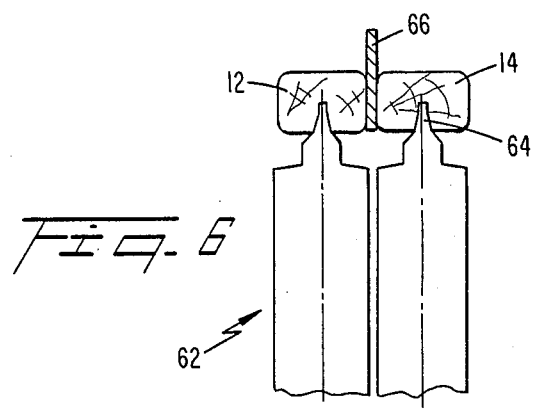
FIG. 6 is an alternate embodiment of a cutting mechanism for splitting and grooving the flange stock material.

Each of the wood flange or chord members 12 and 14 has a generally rectangular cross-section perpendicular to its longitudinal axis as may be seen in FIG. 6. The flange members may be formed of commercially available wooden structural boards or may be formed of laminated veneer lumber (called "LVL") which is readily available in a large variety of lengths and thicknesses.

As will be seen more fully below, the flanges 12 and 14 are cut from rectangular stock material 18 and simultaneously provided with grooves 32 and 34 by means of a unique splitting-grooving machine 20 (FIGS. 4-6) provided off the assembly line 10' at a flange-forming area A. After forming, the grooved flanges or chords 12 and 14 are discharged from machine 20 onto an outfeed table 22 for transfer to a flange feed location 24 via lateral conveyor ramp 26 and flange surge conveyor rack 28. Details of conveyor ramp 26 and surge rack 28 are set forth in the copending U.S. parent application Ser. No. 843,228 or may be as set forth in U.S. Pat. No. 4,356,045 to Alfred et al. The chords 12 and 14 are respectively grouped on opposite sides of web infeed location C (FIG. 7) with their grooves 32 and 34 facing each other, respectively.

The individual web members 16, pre-cut to desired length and width, may undergo a machining operation whereby their longitudinal edges are shaped as at 17 (FIG. 11) to respectively interfit with chord grooves 32 and 34 as discussed infra. The grooves 32,34 preferably have the same cross-section as the web edges 17 or may have other cross-sections such as the type disclosed in my prior copending application Ser. No. 764,180, filed Aug. 9, 1985. Web beveling or shaping can occur off-line at a machining area (not shown) for transfer in stacks to web holding area D (adjacent web infeed location C).

The chords 12 and 14 are conveyed respectively along opposite sides of web members 16 which may be formed as a continuous web in assembly line 10'. The chords 12 and 14 are gradually converged towards web 16 so that machined edges 17 enter grooves 32 and 34 to form a press-fitted interconnecting joint therebetween and thereby the wooden I-beam 11. The machined edges 17 and grooves 32 and 34 are preferably glued prior to joining. The completed wooden I-beam may then be passed through a radio frequency tunnel (not shown) which cures the glued groove of the I-beam 11. The I-beam is discharged onto an outfeed table 13 provided with a beam cutting saw (not shown in detail) which cuts the beam to desired length. Thereafter, the cut wooden I-beams are transferred laterally from the outfeed table by means of a cross-transfer conveyor 25 where the cut beams are ultimately trimmed, if necessary, and stacked using stacker 50 discussed below for subsequent shipment.

FORMING AND GROOVING THE FLANGES

Referring to FIGS. 2-6, and particularly FIG. 2, stacked flange stock material 18 is loaded onto a scissors lift schematically shown at 27 where it rests by gravity against a support fence 29 having an upper end disposed immediately adjacent and slightly above the upper run of a cross conveyor 30 providing one row of flange stock material to the conveyor 30 by incremental raising of the scissors lift and gravity feed of the stock onto the conveyor. The row of stock material 18 is retained against a stop lug 32 adjacent flange stock infeed driven rolls 35 (FIG. 3) for sequential feeding of the individual flange stock units into the splitting-grooving machine 20 via an overhead infeed drive roll 37. The driven infeed rolls 35 are canted to direct the flange stock material 18 against a fence 39 in longitudinal alignment with the overhead infeed drive roll 37. A curved movable plate 40 assures that the leading end of a flange stock material 18 is directed smoothly toward the infeed drive roll 37.

Figure 5:
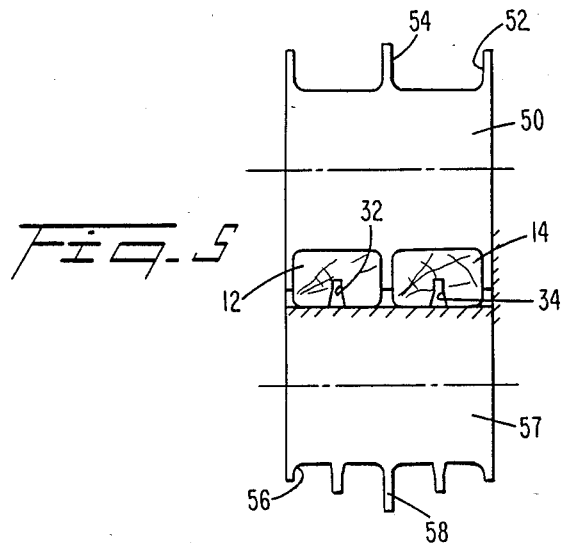
FIG. 5 is a sectional view depicting one embodiment of the cutting mechanism of the splitting and grooving apparatus of FIG. 4.

Referring to FIGS. 4 and 5, splitting-grooving machine 20 comprises overhead infeed drive rolls 37 extending transversely above bed plates 42 for propelling rectangular stock material 18 towards a chord splitter and groover mechanism 45 mounted downstream from the overhead drive rolls 37. Mechanism 45 includes a moulder cutter head 50 provided with shaped edges 52 and a splitter 54 for forming rounded corners in the side of the flanges facing away from the grooves 32,34. The moulder cutter head 50 also partially splits this upward exposed side of the flanges 12,14.

An overhead hold-down bar 55 is provided downstream from the upper moulder cutter head 50 and disposed beneath the hold-down bar is a bottom moulder cutter head 57 which forms the grooves 32,34 in the flange stock material now cut into flange members 12 and 14 by the bottom head and the splitter 58 formed thereon. The overhead hold-down bar 55 is spring loaded to bias the flange stock material 18 against the bed plate 42 from which the bottom moulder cutter head 57 protrudes upwardly. The hold-down bar 55 maintains the flange material in positive sliding contact with the bed plate 42 during the splitting and grooving operation. The splitter blade 58 formed in the bottom moulder cutter head 57 projects slightly above the upward exposed surface of the flange stock material 18 to ensure complete splitting of the stock into the flange members 12,14. The bottom surface 55 of the hold-down bar is provided with a recess 55a to provide spacing between the splitter 58 and hold-down bar.

A dividing bar 60 is mounted downstream from the overhead hold-down bar 55 to separate the flange members 12 and 14 from each other and to direct same out of the splitter and groover area A by means of an outfeed conveyor system 22 which may be of conventional construction to a flange transfer area 26 and flange surge rack 28 which will position the flange members 12 and 14 with their grooves 32,34 facing each other on opposite sides of a web feeder C depicted in FIG. 7. The manner in which the cut flange members 12 and 14 are delivered to the web infeed area (FIG. 7) from the splitter and groover area A may be conventional or as set forth in the copending U.S. application mentioned supra, Ser. No. 843,228.

FIG. 6 is an alternative embodiment of a splitter and groover mechanism in substitution for the top and bottom moulder cutter heads 50,57 of FIG. 5. In the FIG. 6 embodiment, a pair of router motors 62 are mounted with router tips 64 projecting upwardly from the bed plate 42. An overhead splitter bar 66 positioned preferably upstream from the router tips 64 initially cuts the flange stock material 18 into flange members 12 and 14. Subsequently, the bottom surfaces of the cut flange members are grooved with the router tips. The router tips may be shaped to provide internal hourglass groove configurations mentioned in my copending application Ser. No. 764,180, filed Aug. 9, 1985.

One advantage of providing grooves 32,34 in the bottom surface of the flange members riding upon bed plates 42 while hold-down bar 55 maintains positive resilient pressure against the upper surface of the flange stock material is to reduce the friction between the flange stock material and bed plate while maintaining positive alignment and contact with the bed plate by virtue of the hold-down bar assembly. The reduction in friction ensures a constant throughput of flange stock material through the cutting and grooving area A.

AUTOMATIC TRANSFER OF WEB STACKS TO CHORDS AND WEBS ASSEMBLY LINE

FIG. 7 is an illustration as to the manner in which stacks 16' of pre-cut and beveled webs 16 may be stacked as at 45 and sequentially fed stack by stack to web infeed hopper 70 located in the chords and webs assembly line 10' and positioned at the discharge end of a web conveyor transfer 75 in the unique manner described below.

The web transfer conveyor 75 generally comprises a pair of parallel spaced chains 77 (only one shown in FIG. 7) conventionally trained around sprockets 79 which may be motor driven (not shown) in a conventional manner. The chains 77 and associated sprockets 79 are mounted to a support frame resting upon support legs 78. The support frame supports the stacks of web members upon side rails 80 disposed between the chains. The individual stacks of webs are initially delivered by fork truck (not shown) for side by side positioning at 45 upon the upstream end portion of the conveyor 75. The conveyor 75 has a stop 80 which initially retains the plural web stacks along the upstream portion of the conveyor as shown in FIG. 7. Upon actuation by suitable control means, the stop 80 temporarily indexes to a lower position to enable the next in line stack to be conveyed by the chains to the downstream end of conveyor 75 where the stack is positioned against a stop 82 adjacent the infeed hopper 70. Thus, at any particular time, only one stack of webs is in the downstream staging area of the conveyor 75 in abutment with stop 82 while the remaining nexxt in line stacks are positioned in the upstream area.

The infeed hopper 70 may generally be of the type described in the copending U.S. patent application mentioned supra, Ser. No. 843,228, including a pusher plate mechanism (not shown) adapted to continuously feed webs into the chords and webs assembly line from the bottom of the stack within the hopper 70.

When the webs in the hopper 70 drop below a predetermined elevational level defined by the upper end 84 of frame members 86 establishing a side wall of the hopper 70 facing the conveyor 75, a cylinder 88 disposed beneath the chain conveyor 75 is actuated so that its piston rod 88a extends, causing a compound lever arrangement to elevate the forward ends 85a of a pair of forks 85 to a position (shown in phantom line) slightly above the elevational position of the chain conveyor and stop 82. This causes the in-line stack of webs to rest upon the forks 85 (only one shown) whereupon the forks slide along slide shafts 90 disposed beneath the chain conveyor 75 to deliver the in-line stack of webs into a position above the feeding stack within the hopper 70. The forks 85 are mounted at their ends 85b via collars 92 to the slide shafts 90 and move along the slide shaft by means of a cylinder arrangement 94.

The compound lever arrangement mentioned supra preferably comprises an upper bell crank 96 having an upper camming surface 96a adapted to engage an underside of forks 85 to raise and lower the forks. The bell crank 96 is mounted via connecting rod 97 to a lower bell crank 99 connected to piston rod 88a. Thus, it will be seen that extension of the piston rod 88a (shown only in retracted mode) will cause the lower bell crank 99 to pivot counter-clockwise which lowers the connecting rod 97 and causes the upper bell crank 96 to pivot clockwise to raise the forks 85 to the phantom line position.

When the forks 85 are in the extended position (not shown) above the feeding stack of webs within the hopper 70, the cylinder 88 is actuated by suitable control means to cause the forks to descend to their lower position in which the leading portions 85a of the forks within the hopper are disposed elevationally below the upper end 84 of the side walls 86 of the hopper. The forks 85 then withdraw from the hopper by actuation of cylinder arrangement 94. This action causes the bottommot webs of the stack to be scraped off the withdrawing forks 85 by contacting against the upper edge 84 of the side frames 86, whereupon the fresh stack will drop by gravity into the bottom of the hopper for sequential feeding of the webs from the bottom of the stack into the chords and webs assembly line 10' in the manner set forth in my prior copending application Ser. No. 843,228.

The returning action of the forks in the manner described above actuates the infeed chain conveyor 75 which causes the stops 80 to descend below the chains enabling the next in-line stacks to be positioned adjacent the hopper 70 against stop 82 as shown in phantom line in FIG. 7.

Various types of control means may be utilized to initiate the foregoing system of feeding and transferring web stacks into infeed hopper 70. For example, the limit switch (not shown) may be utilized to monitor the level of webs within hopper 70 and which switch will actuate the cylinder 88 when the level of webs drops below upper edge 84 so as to cause the forks 85 to elevate to their upper position into lifting contact with the stack of webs against stop 82. Another limit switch may sense the raising of the forks 85 to their upper position to actuate cylinder and cable arrangement 94 which will cause the forks to slide along shafts 90 to deposit the stack of webs into the infeed hopper. Movement of the slide collars 92 to the forward ends of shaft 90 may be detected by another limit switch which may actuate cylinder 88 to retract piston rod 88a causing the forks to descend which may then actuate cylinder and cable arrangement 94 to withdraw the forks from the hopper while causing the webs to be scraped off the forks into the hopper. This action in turn may actuate the infeed chains of conveyor 75 to stage a next in-line stack against stop 82 by temporarily indexing of stop 80 to a lower position enabling the next in-line stack to descend downstream along the conveyor to stop 82.

As shown in FIG. 7, one of the side frames 100 defining the infeed hopper 70 may be adjustable by hand wheel 102 to accommodate web members of varying width.

The web infeed hopper 70 is formed by front and rear end walls vertically mounted to support frame members (not shown). The front and rear end walls are spaced a sufficient distance apart from each other to allow a web stack to be easily dropped into the hopper with the longest dimension of the webs extending between the end walls. The movable side member 100 extending between the end walls in opposing relation to the mouth of the web hopper 70 facing the lateral conveyor 75 maintains the web stack in positive alignment with the chords and webs assembly line 10' discussed infra.

As mentioned supra, the bottom of the front end wall is formed with a transverse opening through which individual web members 16 are successively conveyed onto the web conveyor from the bottom of the stack. The rear end wall also includes a bottom transverse opening through which a web pusher plate (not shown) translates under the action of a hydraulic or air cylinder (not shown) to successively feed individual web members 16 into a web drive arrangement described below. The web pusher plate and cylinder may be as in the manner described in my copending application.

JOINING THE WEBS AND FLANGES TO FORM THE WOODEN I-BEAM

Figure 9:
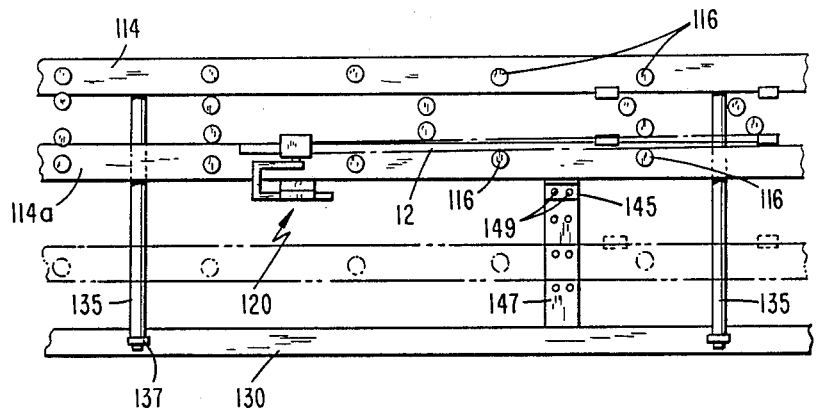
FIG. 9 is a top plan view of a part of the chords and webs assembly line to depict the manner in which the chord quide rollers may be adjusted to form I-beams of varying depth.
Figure 10:
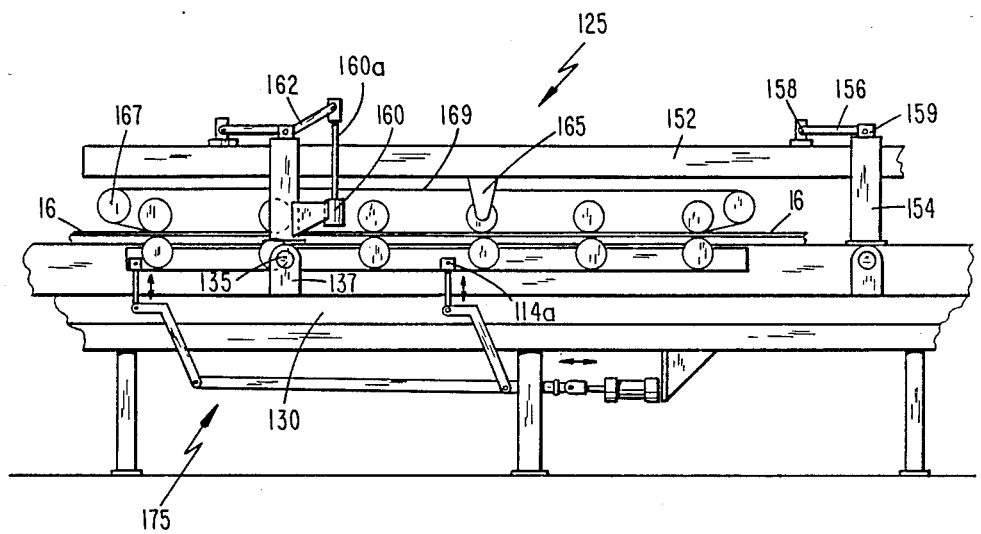
FIG. 10 is a side plan view of an overhead web drive system of the chords and webs assembly line.
Figure 11:
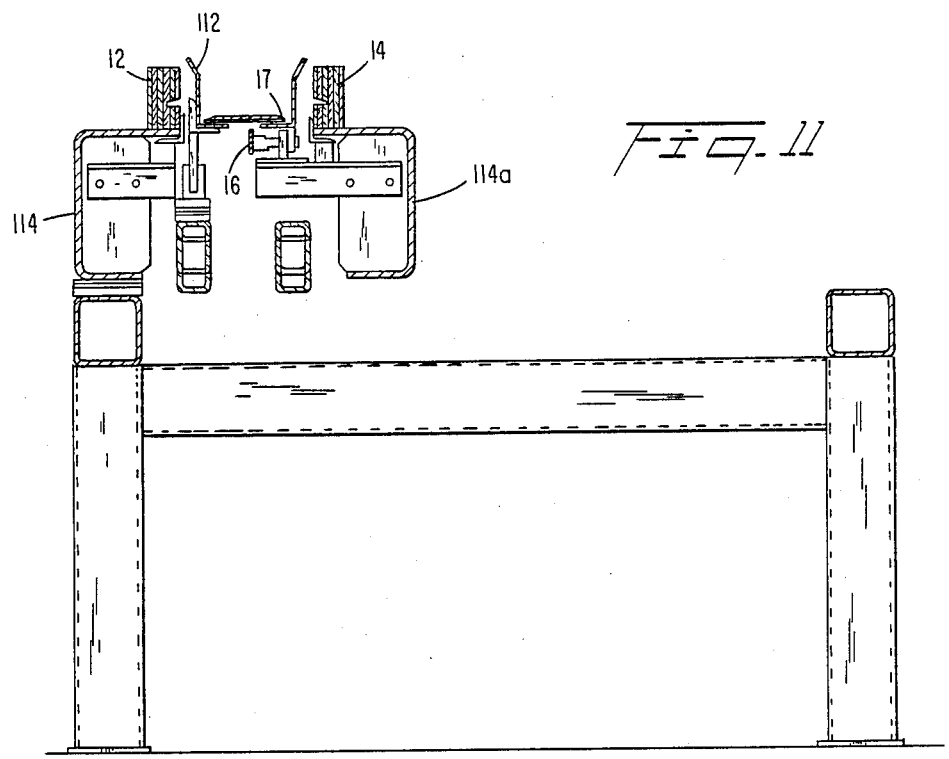
FIG. 11 is a sectional view taken along the line 11—11 of FIG. 8.
Figure 12:
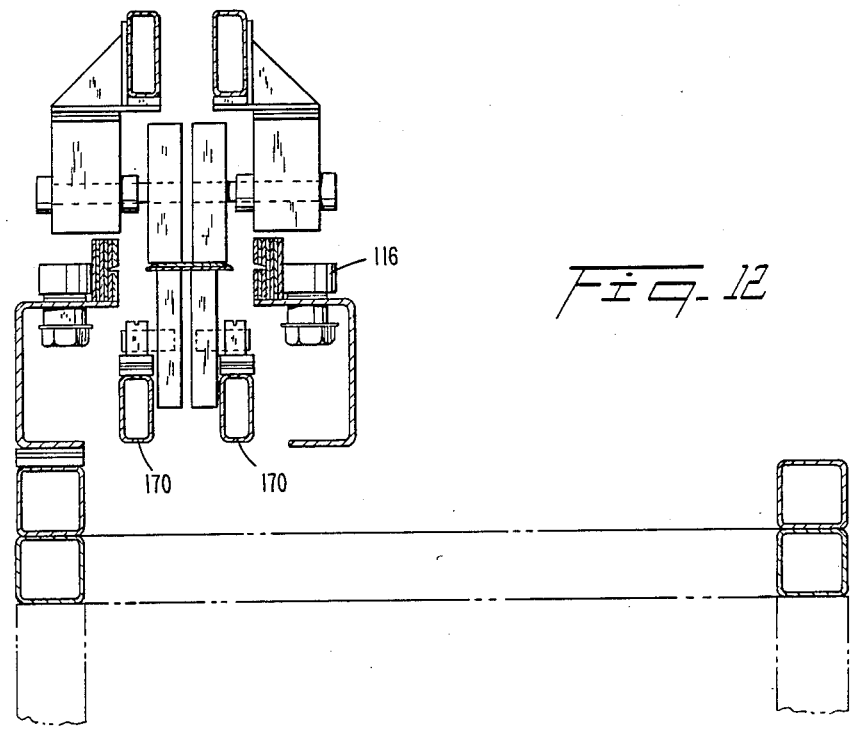
FIG. 12 is a sectional view taken along the line 12—12 of FIG. 8.
Figure 13:
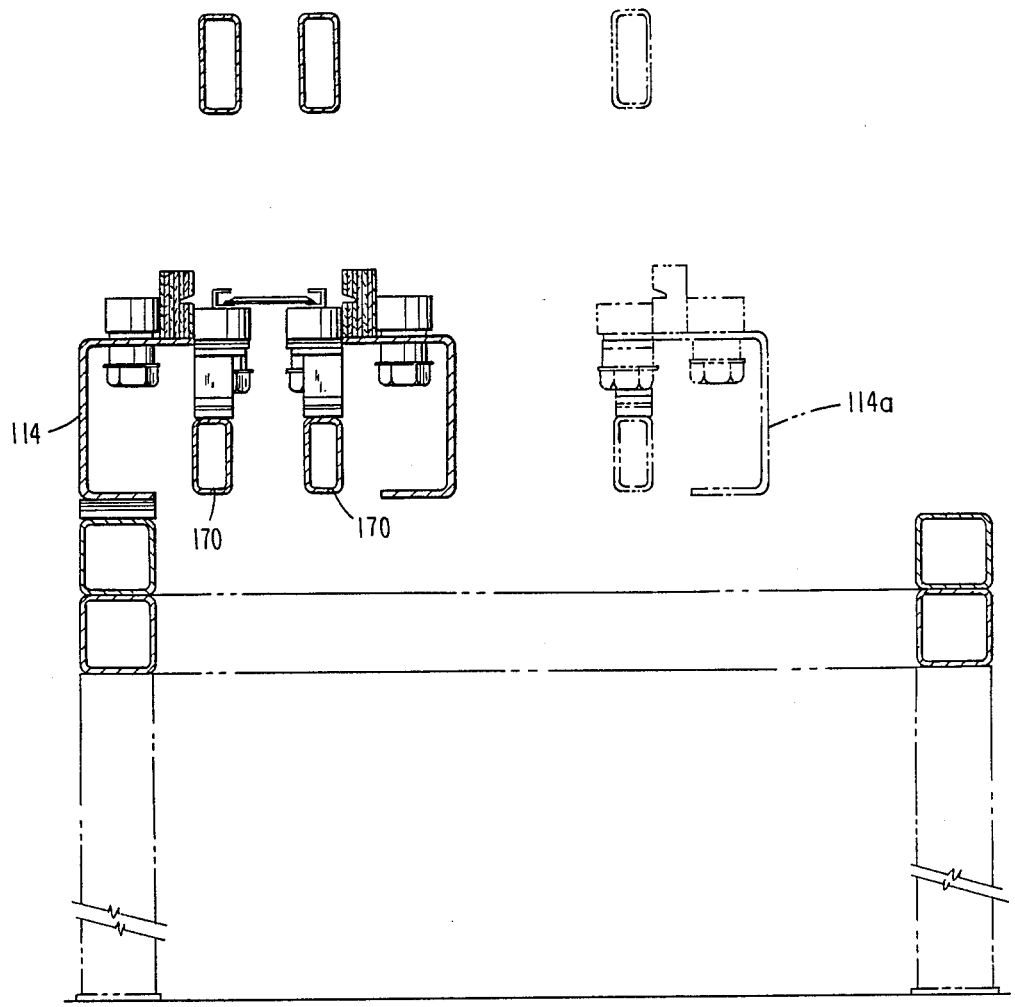
FIG. 13 is a sectional view taken along the line 13—13 of FIG. 8.

As discusses above and with reference to FIGS. 8-15, web members 16 are sequentially fed from the web infeed hopper 70 by pusher plate into contact with a first overhead web support drive system 110 (schematically shown in FIG. 8) which may be of the type disclosed in my aforesaid copending U.S. application. The webs are essentially disposed to travel along support rails 112 such as is illustrated in FIG. 11 while parallel side frame support members 114 and 114a supporting guide rollers 116 are provided for flange members 12,14 traveling outwardly adjacent the web members with their grooves 32,34 facing each other (e.g., FIG. 12).

As illustrated, the chords 12,14 are essentially fed from right to left in FIG. 8 and between converging chord guide rollers 116 secured to side frames 114,114a and rotatable about vertical shafts. As illustrated in FIG. 8, overhead chord drive wheels 120 may be provided to drive the chords prior to their converging movement towards the web members. As depicted in FIG. 10, an adjustable overhead web drive 125 contacts the continuous web along its upper surface to advance the web into converging and mating relationship with the chord members.

The chord guide rolls 116 rotatable about vertical axes press against outer surfaces of the flange members and are secured to C-shaped side frames 114,114a mounted to a fixed support base 130 as shown in FIGS. 9 and 10. One of the C-shaped side frames 114 extending along one side of the chords and webs assembly line 10' may be fixed to the support base 130 while the other of the side frames 114a is advantageously movably mounted to the support base. Specifically, the movable side frame 114a rests upon support shafts 135 extends through the side frame at longitudinally spaced intervals from each other. One end of each support shaft 135 is secured to the fixed support base 130 by collars 137 as shown in FIGS. 9 and 10. A cylinder and cable arrangement 140 (FIG. 14 only) connects the movable side frame 114a to the stationary support base 130. Actuation of the cylinder/cable arrangement 140 causes the movable side frame 114a to slide along the support shafts 135 until a desired spacing is achieved between the movable and stationary side frames 114,114a. The movable side frame 114a is then fixed into a stationary position along the shafts by virtue of an L-shaped stop plate 145 removably secured to a bottom plate (fixed to the stationary base 130) by means of pins 149. In this manner, it will be appreciated that adjustment of the movable side frame 114a advantageously enables the chords and webs assembly line 10' to accommodate and manufacture I-beams of varying depth as determined by the width of the web members 16 as measured in the transverse direction of the assembly line.

With reference to FIG. 10, the overhead web drive 125 comprises a pair of parallel longitudinally extending bars 152 (only one shown) spaced apart from each other and secured to the side frames 114,114a by upright support ports 154. Attachment of each space bar 152 occurs by means of connecting rods 156 pivotally secured at opposite ends thereof to the bar and upright support ports as at 158 and 159, respectively. Each space bar 152 is vertically adjustable in relation to the underlying continuous web by means of a cylinder and piston 160 and 160a attached to one of the upright posts associated with each support bar 152 with the piston 160a connected to an associated connecting rod 156 by means of a connecting rod 162. Thus, extension of each piston rod 160a upon actuation of the cylinder 160 causes the space bars to lower the overhead web drive. Retraction of the piston rod 160a raises the overhead web drive.

Each space bar 152 supports a series of transverse drive and driven rollers suspended from the associated bar by means of hanger brackets representatively shown at 165 in FIG. 10. One of the transverse rollers in each of the overhead web drive pairs respectively associated with space bars 152 may be a driven roller such as at 167. A belt 169 trained around the rollers is adapted to contact the upper surface of the continuous web when the overhead web drive is in the operating position shown in FIG. 10.

The feature of an adjustable overhead web drive advantageously enables the drive system to be raised in the event access to the chords and webs assembly line is necessary to correct a defect or malfunction in the assembly line. The ability to raise and lower the web drive system 125 is also desirable to enable the web drive to accommodate flanges 12 and 14 of varying uniform thickness as may occur depending upon the structural properties required of the wooden I-beams.

Although not shown in detail, the underlying web support beams 17 may be vertically movable in relation to support base 130 by means of a retractable cylinder arrangement schematically shown at 175 in FIG. 10. The underlying supports 170 may be secured to the stationary support base 130 or another stationary support structure (not shown) in a manner structurally similar or identical to that disclosed in FIG. 10 for overhead web drive 125. Movement of the members 17 enables spacers or shims (not shown) to be positioned so that the elevational position of the continuous web 16 may be varied depending upon the thickness of flanges 12 and 14 and the resulting elevational location of their grooves 32 and 34.

The chord drive wheels 120 and the overhead web drive 125 cooperate to advance the chords and webs along the assembly line 10' as the chords advance between the idler pair of squeeze rollers and additional chord converging guide rollers such as at 182 in FIG. 8 which progressively force the chords 12 and 14 towards the two member 16 so that the beveled edges of the web members enter into their final disposition in the grooves 32 and 34 downstream from their position shown in FIG. 15. Further pairs of squeeze rollers rotatable about vertical axes are positioned along opposite sides of chords 12 and 14 now joined to web 16 for maintaining the united webs and chords in joined relationship as the I-beam advances through the chords and webs assembly line 10'. Such further pairs of rollers are schematically shown in FIG. 8 as at 184. The arrangement of squeeze roller sets and conveying guide rollers for effecting this gentle type of chord converging and pressing assembly operation is well known in the trade.

After the webs 16 and chords 12 and 14 are joined together in the manner described above to form the wooden I-beam, the beam is driven through assembly line 10' by means of a beam support drive 190 which may comprise pivotally mounted and therefore adjustable overhead hold-down rollers engaging the upwardly exposed chord edges. The beam drive 190, assisted by guide idler rollers 184, conveys the wooden I-beam through an optional R/F tunnel where the glued web to chord joints may be cured and thereafter onto a series of longitudinally spaced tablets depicted in FIG. 1 where the beams are singulated with a flying saw into desired length.

The longitudinally spaced outfeed tablets may be a type generally described in my copending U.S. patent application Ser. No. 843,228. As the outfeed tablets descend, the cut wooden I-beam engages a series of lateral conveyors such as at 190 laterally conveying the I-beam to a testing area and trim saw assembly at 25. The tested and cut I-beams are then individually conveyed along a series of roll cases 192 to a nester and stacking area 50.

STACKING OF CUT I-BEAMS

Figure 17:
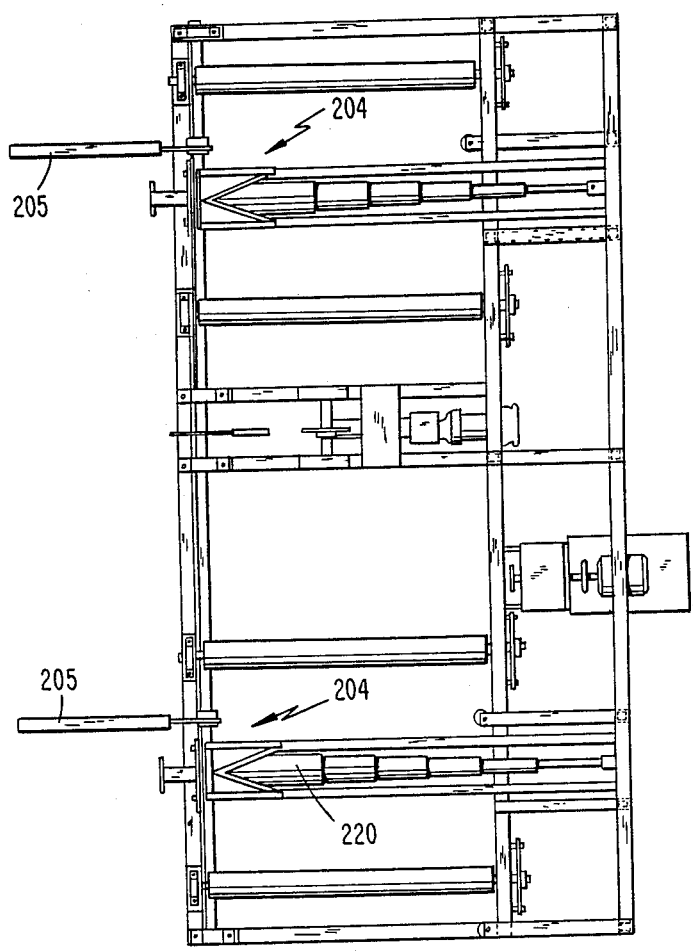
FIG. 17 is a top plan view of the stacking mechanism of FIG. 16.

The individual cut wooden I-beams are conveyed along longitudinal roll cases 192 onto a series of lateral chain conveyors 199 in FIG. 1 that receive a cut wooden I-beam and discharge same onto laterally extending inclined idler rollers 200 schematically shown in FIG. 16 only and terminating at a lowermost end thereof in a curved fence 202 presenting a convex curved surface projecting upwardly from the rollers towards a stacking fence 204 described infra. As depicted in FIGS. 16 and 17, the cut wooden I-beams are initially conveyed along rollers 200 so that both flanges 12 and 14 rest upon the rollers and with one of the flanges (14 in FIG. 16) resting against the curved guide fence 202.

The individual cut wooden I-beams are sequentially transferred from the rollers 200 against the stacking fences 204 by a series of transfer beams 205 pivotally secured to a support shaft 207 journaled with bearings 208 to a support base 210. The shaft 207 is motor driven and periodically actuated (e.g., by a limit switch) when the presence of a cut wooden I-beam is detected against the curved fence 202. The transfer beams are initially disposed in a lower position below the rollers 200. The series of transfer beams 205 pivot in unison in response to rotation of motor drive shaft 207 to transfer the cut wooden I-beam to the upper end 212 of the curved fence 202 as depicted in FIG. 16. FIG. 16 also depicts the cut wooden I-beam in an intermediate transfer position wherein the transfer beams are depicted in phantom line.

The transfer beams 205 are arranged to pivot the cut wooden I-beams against the stacking fences 204 which yield against the force of the transfer beams and wooden I-beam pressing thereagainst to enable the wooden I-beam to drop downwardly from upper end 212 of the curved fence 202 so that the flanges 14 rest against the upper surface of rollers 215 which upper surface is disposed below upper end 212 by a distance slightly greater than the height of the flange 14.

The stacking fences 214 are mounted on retractable cylinders 220 or like structures which enable the stacking fences to retract from the phantom line position of FIG. 16 to the solid line position in which solid line position a series of staggered and nested cut wooden I-beams extend across the entire length of rolls 215 (not shown in detail). In the solid line position of stacking fence 204, and since various of the rolls 215 are driven, actuation of the driven rolls operates to convey the entire series of nested and stacked wooden I-beams out of the stacking/nesting area 50 to a wrapping or shipping area (not shown).

As mentioned above, each transfer beam 205 in its lowermost positions extends beneath the elevation of the rollers 205 enabling the cut wooden I-beams to sequentially descend by gravity against the curved guide plate or fence 202 so that one end surface of the flange 14 in contact with the guide 202 is capable of sliding along the curved guide during pivotal movement of the transfer beams 205 into their upper positions whereupon the cut wooden I-beam is positioned against the fence. In that position, the retractable fences 204 yield to cause the fences to partially retract against the force of the transfer beams with the result that the I-beam is positioned upright against the fence as depicted in FIG. 16. In this manner, and because of the differential height relationship between upper end 212 of the curved guide and the upper surface of rolls 215, it will thus be appeciated that the next in-line I-beam 16" transferred by beams 205 into the upright position on upper end 212 will be stacked against the previous I-beam in a staggered and nested relationship whereby its flange 14 rests partially against an upper surface flange 14 of the previous I-beam and also partially against the web portion of the previous I-beam. Then another next in-line I-beam 16''' upon reaching the upright position resting upon upper end 212 will cause further retraction of fences 204 so that the I-beam 16''' will assume the position depicted in solid line in FIG. 16. In this manner, a compact, stable stacking structure of nested and staggered wooden I-beams will result and when a predetermined number of said I-beams are stacked against the fence, the driven rolls are actuated to convey the stack to a shipping area.

It will be recognized that while the various foregoing advantages are optimal either individually or in combination, the benefits of the invention may still be realized by departing from one or more of such features within the scope of the claims.

The present invention may be embodied in other specific forms without departing from the spirit or essential characteristics thereof. The present embodiments are presented merely as illustrative and not restrictive, with the scope of the invention being indicated by the attached claims rather than the foregoing description. All advantages which come within the meaning and range of equivalency of the claims are therefore intended to be embraced therein.

What is claimed is:

1. A production line assembly for manufacturing a unitary wooden I-beam from a pair of longitudinally grooved elongated wooden chord members and planar wooden web members having opposite longitudinally shaped edges, the assembly comprising:

means for conveying web members in generally end to end relationship as a substantially continuous web;

means for conveying a pair of chords respectively along opposite sides of the continuous web with the longitudinal grooves facing the continuous web, said chord conveying means includes chord drive members;

means for directing the pair of chords towards the continuous web so that the opposite edges of the continuous web are respectively inserted into the longitudinal grooves in the pair of chords to form an interconnecting joint therebetween and thereby an I-beam, said directing means including a plurality of guide rollers mounted on side frames extending along opposite sides of the production line, one of the side frames being adjustable in a direction generally perpendicular to the chords to vary the spacing between the side frames to thereby enable the production line to manufacture wooden I-beams of varying depths; the adjustable side frame being mounted upon shaft means connected to a stationary support base, the shaft means extending generally perpendicular to the adjustable side frame, and stop means disposed on the stationary support base outwardly adjacent the adjustable side frame and against which stop means the adjustable side frame abuts, said stop means being positionable at selective spaced locations along the support base to fix the adjustable spaced location of the adjustable frame along the shaft means;

a cylinder and cable arrangement connected between the movable side frame and the stationary base for moving the movable side frame along the shaft means into abutting contact with the stop means;

overhead web drive means within the production line mounted to engage the upward exposed surface of the continuous web for directing the continuous web along the production line, at a predetermined continuous speed, said overhead web drive means being elevationally adjustably mounted to the side frames to accommodate chords of varying thicknesses by being disposed to contact the upper surface of the continuous web at differential elevational positions of the continuous web corresponding to the elevational position of the grooves in the chords; and web supporting means disposed in contact with the lower surface of the continuous web and means for elevationally adjusting the position of said web supporting means for accommodating chords of varying thicknesses.

2. A production line assembly for manufacturing a unitary wooden I-beam from a pair of longitudinally grooved elongated wooden chord members and planar wooden web members having opposite longitudinally shaped edges, the assembly comprising:

means for conveying web members in genrally end to end relationship as a substantially continuous web;

means for conveying a pair of chords respectively along opposite sides of the continuous web with the longitudinal grooves facing the continuous web, said chord conveying means including chord drive members;

means for directing the pair of chords towards the continuous web so that the opposite edges of the continuous web are respectively inserted into the longitudinal grooves in the pair of chords to form an interconnecting joint therebetween and thereby an I-beam, said directing means including a plurality of guide rollers mounted on side frames extending along opposite sides of the production line, one of the side frames being adjustable in a direction generally perpendicular to the chords to vary the spacing between the side frames to thereby enable the production line to manufacture wooden I-beams of varying depths;

overhead web drive means within the production line mounted to engage the upward exposed surface of the continuous web for directing the continuous web along the production line, at a predetermined continuous speed, said overhead web drive means being elevationally adjustably mounted to the side frames to accommodate chords of varying thicknesses by being disposed to contact the upper surface of the continuous web at differential elevational positions of the continuous web corresponding to the elevational positions of the grooves in the chords said overhead web drive means including longitudinally extending support bar means mounted to the side frames with support posts and a series of driven and drive rollers mounted to said longitudinally extending support bar means to extend transversely above the continuous web, and belt means trained around the rollers for engaging the continuous web, said longitudinally extending support bar means supporting the overhead web drive means being connected to the support posts by means of cylinder and crank means operable for adjusting the vertical height of the overhead web drive means upon actuation of the cylinder, and web supporting means disposed in contact with the lower surface of the continuous web and means for elevationally adjusting the position of said web supporting means for accommodating chords of varying thicknesses.

3. A production line assembly for manufacturing a unitary wooden I-beam from a pair of longitudinally grooved elongated wooden chord members and planar wooden web members having opposite longitudinally shaped edges, the assembly comprising:

means for conveying web members in generally end to end relationship as a substantially continuous web;

means for conveying a pair of chords respectively along opposite sides of the continuous web with the longitudinal grooves facing the continuous web, said chord conveying means including chord drive members;

means for directing the pair of chords towards the continuous web so that the opposite edges of the continuous web are respectively inserted into the longitudinal grooves in the pair of chords to form an interconnecting joint therebetween and thereby an I-beam, said directing means including a plurality of guide rollers mounted on side frames extending along opposite sides of the production line, one of the side frames being adjustable in a direction generally perpendicular to the chords to vary the spacing between the side frames to thereby enable the production line to manufacture wooden I-beams of varying depths; said adjustable side frame being mounted upon shaft means connected to a stationary support base, the shaft means extending generally perpendicular to the adjustable side frame, and stop means disposed on the stationary support base outwardly adjacent the adjustable side frame and against which stop means the adjsutable side frame abuts, said stop means being positionable at selective spaced locations along the support base to fix the adjustable spaced location of the adjustable frame along the shaft means;

a motor driven screw connected between the movable side frame and the stationary base for moving the movable side frame along the shaft means into abutting contact with the stop means;

overhead web drive means within the production line mounted to engage the upward exposed surface of the continuous web for directing the continuous web along the production line, at a predetermined continuous speed, said overhead web drive means being elevationally adjustably mounted to the side frames to accommodate chords of varying thicknesses by being disposed to contact the upper surface of the continuous web at differential elevational positions of the continuous web corresponding to the elevational position of the grooves in the chords; and web supporting means disposed in contact with the lower surface of the continuous web and means for elevationally adjusting the position of said web supporting means for accommodating chords of varying thicknesses.

4. A production line assembly for manufacturing a unitary wooden I-beam from a pair of longitudinally grooved elongated wooden chord members and planar wooden web members having opposite longitudinally shaped edges, the assembly comprising:

means for conveying web members in generally end to end relationship as a substantially continuous web;

means for manufacturing a pair of elongated wooden chord members each including a longitudinal groove in one surface thereof, from elongated rectangular wooden stock material, said manufacturing means comprising a moulder cutter head means for splitting and grooving said wooden stock material, the moulder cutter head being mounted on a common shaft extending transversely beneath the bed plate, said moulder cutter head including shaped edges and a splitter projecting upwardly above through an opening in the bed plate to shape and cut and groove a lower surface of said stock material, means of supporting a length of the stock material during cutting engagement with the moulder cutter head means; the stock supporting means including a bed plate and fence adapted to respectively contact a bottom surface and a side edge of the stock material and thereby prevent significant deviation of the longitudinal axis of said stock material during cutting and grooving; and means for providing relative movement between the stock material and the moulder cutter head substantially along the longitudinal axis of said stock material to split said stock material into substantially identical chord members while forming the longitudinal grooves;

means for conveying a pair of chords respectively along opposite sides of the continuous web with the longitudinal grooves facing the continuous web, said chord conveying means including chord drive members;

means for directing the pair of chords towards the continuous web so that the opposite edges of the continuous web are respectively inserted into the longitudinal grooves in the pair of chords to form an interconnecting joint therebetween and thereby an I-beam, said directing means including a plurality of guide rollers mounted on side frames extending along opposite sides of the production line, one of the side frames being adjustable in a direction generally perpendicular to the chords to vary the spacing between the side frames to thereby enable the production line to manufacture wooden I-beams of varying depths;

overhead web drive means within the production line mounted to engage the upward exposed surface of the continuous web for directing the continuous web along the production line, at a predetermined continuous speed, said overhead web drive means being elevationally adjustably mounted to the side frames to accommodate chords of varying thicknesses by being disposed to contact the upper surface of the continuous web at differential elevational positions of the continuous web corresponding to the elevational position of the grooves in the chords; and web supporting means disposed in contact with the lower surface of the continuous web and means for elevationally adjusting the position of said web supporting means for accommodating chords of varying thicknesses.

5. The production line assembly of claim 4, further including an overhead moulder cutter head mounted upstream from the moulder cutter head disposed below the bed plate, said overhead moulder cutter head providing initial splitting of said stock material into said chord members and also shaping surfaces of said stock material other than the lower surface of said stock material facing the bed plate.

6. The production line assembly of claim 5, further including a hold down bar assembly disposed above the bottom moulder cutter head.

7. A production line assembly for manufacturing a unitary wooden I-beam from a pair of longitudinally grooved elongated wooden chord members and planar wooden web members having opposite longitudinally shaped edges, the assembly comprising:

means for conveying web members in generally end to end relationship as a substantially continuous web;

means for conveying a pair of chords respectively along opposite sides of the continuous web with the longitudinal grooves facing the continuous web, said chord conveying means including chord drive members;

means for directing the pair of chords towards the continuous web so that the opposite edges of the continuous web are respectively inserted into the longitudinal grooves in the pair of chords to form an interconnecting joint between and thereby an I-beam, said directing means including a plurality of guide rollers mounted on side frames extending along opposite sides of the production line, one of the side frames being adjustable in a direction generally perpendicular to the chords to vary the spacing between the side frames to thereby enable the production line to manufacture wooden I-beams of varying depths;

overhead web drive means within the production line mounted to engage the upward exposed surface of the continuous web for directing the continuous web along the production line, at a predetermined continuous speed, said overhead web drive means being elevationally adjustably mounted to the side frames to accommodate chords of varying thicknesses by being disposed to contact the upper surface of the continuous web at different elevational positions corresponding to the elevational position of the grooves in the chords;

web supporting means disposed in contact with the lower surface of the continuous web and means for elevationally adjusting the position of said web supporting means for accommodating chords of varying thicknesses, and means for successively feeding a stack of pre-cut web members to an upstream position of the production line for sequential feeding of the web members in the stack into the production line as a continuous web, said web feeding means including web infeed chain conveyor means for receiving individual stacks of webs positioned side by side on an upper run of said infeed chain conveyor means and stop means for maintaining said individual stack of webs in predetermined positions on said infeed conveyor means.

8. The production line assembly of claim 7, further including control means for releasing the stop means to selectively feed an individual one of said stacks of webs to a downstream end of said infeed chain conveyor means located adjacent a web infeed hopper.

9. The production line assembly of claim 8, further including a web transfer mechanism for delivering said individual stack of webs positioned at the downstream end of the web infeed conveyor into said infeed hopper, said transfer mechanism including a pair of forks movable between upper and lower positions, in said lower position said pair of forks being disposed elevationally below the upper run of said infeed conveyor means, raising of said transfer forks into their upper position causing said forks to contact and support said stack of web members, movement of said forks towards the web infeed hopper carrying said stack of web members causing said stack to be moved into the infeed hopper, lowering of said forks in their extended position within the infeed hopper and retraction of said forks out of said hopper causing said stack of webs to be scraped from said forks and dropped into the infeed hopper.

10. The production line assembly of claim 9, wherein said forks are mounted for sliding movement along shaft means extending below the downstream end of the infeed chain conveyor means.

11. The production line assembly of claim 10, further including a cylinder arrangement mounted generally parallel to said shaft means and connected to the forks for moving said forks along said shaft means.

12. The production line assembly of claim 11, further including a cylinder and crank arrangement mounted beneath the infeed chain conveyor means for raising and lowering said forks in response to a signal from said control means.

13. The production line assembly of claim 12, wherein said web infeed hopper is defined by front and rear walls extending transversely with respect to the direction of feed of said webs into the assembly line and a fixed side wall extending between the front and rear walls, and a second side wall means formed adjacent the downstream end of said infeed chain conveyor means, said second side wall being open to the chain conveyor means to enable the forks supporting a stack of webs to pass through the second side wall means into the infeed hopper when said forks are in the raised position, and whereby lowering of said forks into the lower position causes bottommost web members within the stack to be captured by the second side wall as the forks withdraw towards the infeed chain conveyor means whereby said stack is scraped off into the infeed hopper.

14. A production line assembly for manufacturing a unitary wooden I-beam from a pair of longitudinally grooved elongated wooden chord members and planar wooden web membrs having opposite longitudinally shaped edges, the assembly comprising:

means for conveying web members in generally end to end relationship as a substantially continuous web;

means for conveying a pair of chords respectively along opposite sides of the continuous web with the longitudinal grooves facing the continuous web, said chord conveying means including chord drive members;

means for directing the pair of chords towards the continuous web so that the opposite edges of the continuous web are respectively inserted into the longitudinal grooves in the pair of chords to form an interconnecting joint therebetween and thereby an I-beam, said directing means including a plurality of guide rollers mounted on side frames extending along opposite sides of the production line, one of the side frames being adjustable in a direction generally perpendicular to the chords to vary the spacing between the side frames to thereby enable the production line to manufacture wooden I-beams of varying depths;

overhead web drive means within the production line mounted to engage the upward exposed surface of the continuous web for directing the continuous web along the production line, at a predetermined continuous speed said overhead web drive means being elevationally adjustably mounted to the side frames to accommodate chords of varying thicknesses by being disposed to contact the upper surface of the continuous web at differential elevational positions of the continuous web corresponding to the elevational position of the grooves in the chords, web supporting means disposed in contact with the lower surface of the continuous web and means for elevationally adjusting the position of said web supporting means for accommodating chords of varying thicknesses, means for cutting the wooden I-beams formed on the production line into predetermined lengths; and means for conveying the cut wooden I-beams to a stacking area, the stacking area including a series of inclined stacking roll cases receiving the cut wooden I-beam from chain conveyor means, a lower inclined end of said stacker roll cases terminating in a curved fence presenting a convex curved surface projecting upwardly from the lower end of said inclined stacker roll cases, and transfer beam means normally disposed below the stacker roll cases for transferring individual cut wooden I-beams conveyed to the bottom of the inclined stacker roll cases for movement along the curved fence into a generally upright position against a stacking fence located adjacent an upper end of the curved fence.

15. The production line assembly of claim 14, wherein said transfer beam means includes a plurality of transfer beams respectively disposed between adjacent ones of said stacker roll cases and being pivotally secured at one end thereof to a common shaft rotatable to pivot the transfer beams from their lower position below the roll cases so that the wooden I-beam member having both flanges resting upon said transfer beams is conveyed with one surface of a flange of the wooden I-beam member in sliding guiding contact with the curved fence until said transfer beams pivot the cut wooden I-beam into the upright position against the stacking fence.

16. The production line assembly of claim 15, wherein said stacking fence is movable along support means having a support surface disposed elevationally below the upper curved end of said curved fence so as to receive the flange member in contact with said curved fence for supporting the cut wooden I-beam in upright position, said stacking fence being movable away from the curved fence under the force of the transfer beam means reaching their upper position, whereby the flange member of the cut wooden I-beam in contact with the curved fence drops down onto the support means and is resiliently biased by the stacking fence towards the curved fence, thereby enabling the next in line cut wooden I-beam to alternately nest against the previous wooden I-beam conveyed against the stacking fence by virtue of contact of the bottom flange of the next in line wooden I-beam against the web member and upper facing surface of the bottom flange of the previous wooden I-beam so that a plurality of said wooden I-beams are engaged with each other in an alternately staggered and nesting relationship.

17. The production assembly line of claim 16, wherein said movable stacking fences are disposed between conveyor means against which said staggered and nested I-beams rest, and means for actuating said conveyor means for conveying a predetermined number of said staggered and nested wooden I-beams towards a shipping area.

* * * * *